US008498006B2

(12) United States Patent
Kawabata et al.

(10) Patent No.: US 8,498,006 B2
(45) Date of Patent: Jul. 30, 2013

(54) DATA PROCESSING APPARATUS INCLUDING EXTERNAL MEMORY STORAGE OF DESIGNATION INFORMATION

(75) Inventors: Mie Kawabata, Toyokawa (JP); Shoji Imaizumi, Shinshiro (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 652 days.

(21) Appl. No.: 12/369,035

(22) Filed: Feb. 11, 2009

(65) Prior Publication Data

US 2009/0316188 A1 Dec. 24, 2009

(30) Foreign Application Priority Data

Jun. 20, 2008 (JP) ................. 2008-161818

(51) Int. Cl.
*G06F 3/12* (2006.01)
*G06K 15/00* (2006.01)
*H04L 9/32* (2006.01)

(52) U.S. Cl.
USPC ........ 358/1.15; 358/1.14; 358/1.16; 713/171; 713/165

(58) Field of Classification Search
USPC .......................... 358/1.13–1.16; 713/165, 171
See application file for complete search history.

(56) References Cited

U.S. PATENT DOCUMENTS

| 5,638,511 A * | 6/1997 | Nezu ................................. 726/5 |
| 5,752,040 A * | 5/1998 | Kaneko et al. ................. 717/170 |
| 5,918,226 A * | 6/1999 | Tarumi et al. ........................ 1/1 |
| 6,728,947 B1 * | 4/2004 | Bengston ....................... 717/103 |
| 7,215,433 B1 * | 5/2007 | Kawaoka et al. ............. 358/1.15 |
| 7,349,864 B2 * | 3/2008 | Ohsaki ........................ 705/7.26 |
| 7,515,290 B2 * | 4/2009 | Negishi et al. ............... 358/1.15 |
| 7,801,918 B2 * | 9/2010 | Iwase ............................ 707/785 |
| 7,826,077 B2 * | 11/2010 | Tamai et al. ................ 358/1.14 |
| 7,839,515 B2 * | 11/2010 | Shigeeda ..................... 358/1.14 |
| 7,924,453 B2 * | 4/2011 | Nelson et al. ............... 358/1.15 |
| 2003/0076537 A1 * | 4/2003 | Brown .......................... 358/1.16 |
| 2003/0206314 A1 * | 11/2003 | Tanimoto ..................... 358/1.15 |

(Continued)

FOREIGN PATENT DOCUMENTS

| JP | 09-223061 | 8/1997 |
| JP | 2004-227476 A | 8/2004 |

(Continued)

OTHER PUBLICATIONS

Notice of Grounds of Rejection issued in the corresponding Japanese Patent Application No. 2008-161818 dated May 11, 2010, and an English Translation thereof.

(Continued)

*Primary Examiner* — Dennis Dicker
(74) *Attorney, Agent, or Firm* — Buchanan Ingersoll & Rooney PC

(57) ABSTRACT

A controller of a data processing apparatus recognizes connection of a USB memory to a USB terminal. The controller reads designation information stored in the USB memory. The designation information specifies a process to be executed by the data processing apparatus. The controller outputs an instruction for executing a process specified by the designation information to each portion of the data processing apparatus, such as a scanner portion or a printer portion, based on the designation information.

6 Claims, 14 Drawing Sheets

U.S. PATENT DOCUMENTS

| | | |
|---|---|---|
| 2004/0156066 A1 | 8/2004 | Mishima et al. |
| 2006/0055968 A1 | 3/2006 | Sato et al. |
| 2006/0139680 A1 | 6/2006 | Okamoto et al. |
| 2008/0235512 A1* | 9/2008 | Minagawa .................. 713/171 |
| 2008/0297845 A1* | 12/2008 | Sakamoto .................. 358/1.15 |

FOREIGN PATENT DOCUMENTS

| | | |
|---|---|---|
| JP | 2004-261984 | 9/2004 |
| JP | 2005-109989 | 4/2005 |
| JP | 2005-190230 | 7/2005 |
| JP | 2006-067560 A | 3/2006 |
| JP | 2006-215929 | 8/2006 |
| JP | 2006-240152 | 9/2006 |
| JP | 2007-081483 | 3/2007 |
| JP | 2007-129488 | 5/2007 |
| JP | 2007-251279 | 9/2007 |
| JP | 2007-328453 | 12/2007 |
| JP | 2008-022107 | 1/2008 |

OTHER PUBLICATIONS

Notice of Grounds of Rejection dated Jul. 20, 2010, issued in the corresponding Japanese Patent Application No. 2008-161818, and an English Translation thereof.

Office Action (Decision for Dismissal of Amendment) dated Feb. 1, 2011, issued in the corresponding Japanese Patent Application No. 2008-161818, and an English Translation thereof.

* cited by examiner

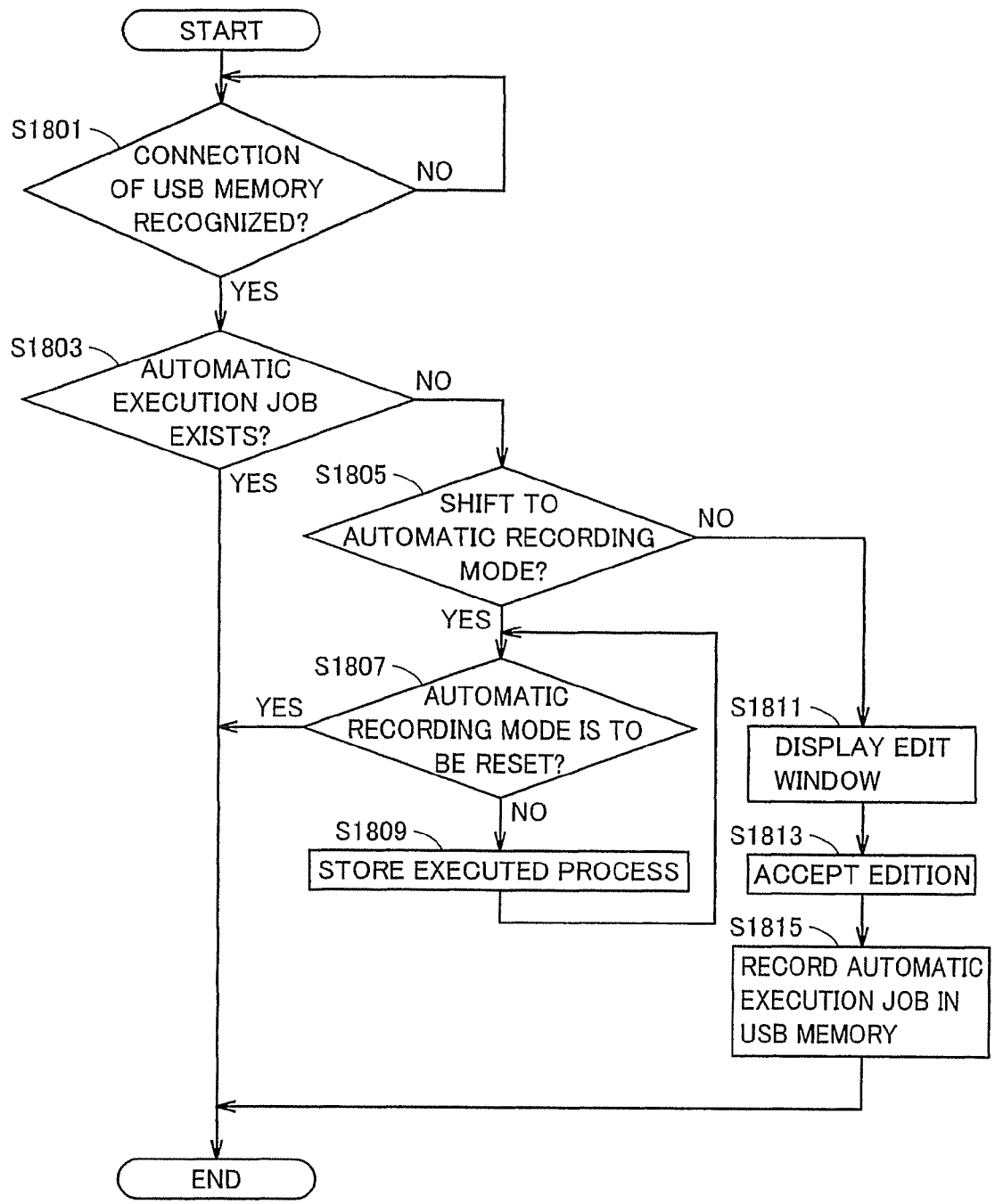

DATA PROCESSING APPARATUS INCLUDING EXTERNAL MEMORY STORAGE OF DESIGNATION INFORMATION

This application is based on Japanese Patent Application No. 2008-161818 filed with the Japan Patent Office on Jun. 20, 2008, the entire content of which is hereby incorporated by reference.

BACKGROUND OF THE INVENTION

1. Field of the Invention

The present invention relates to a data processing apparatus performing a designated process on document data and image data. More particularly, the present invention relates to a data processing apparatus to which a portable external memory is connected.

2. Description of the Related Art

Some data processing apparatuses such as MFP (Multi Function Peripheral) installed in offices and the like store, in addition to data to be processed, the process content for the data into a storage region called a BOX to perform data processing.

Japanese Laid-Open Patent Publication No. 2004-227476 discloses a data processing apparatus having a plurality of BOXes.

Japanese Laid-Open Patent Publication No. 2006-067560 discloses a document processing apparatus which automatically changes a document in a BOX when a prescribed execution condition such as document reception or document registration completion is satisfied.

In recent years, a plurality of data processing apparatuses are often set up in one office. In such a situation, when an apparatus used by a user becomes unavailable due to paper-out, a failure, or the like, the user can continue the process underway by moving to another apparatus.

In this case, however, the user has to input the settings of the process again at another apparatus. It is cumbersome for the user to input the settings of a process many times in this way. Moreover, although the user intends to make the same settings, he/she is likely to make an error in operation.

SUMMARY OF THE INVENTION

The present invention is made to solve the problems as described above. A main object of the present invention is to provide a data processing apparatus which does not require input of settings by the user in data processing.

In accordance with one aspect of the present invention, a data processing apparatus is provided. The data processing apparatus includes a connector to which a removable external memory is attachable. The external memory stores designation information for specifying a process to be executed by the data processing apparatus, of a plurality of processes executable by the data processing apparatus on document data or image data. The designation information is described in a format common to the data processing apparatus and another data processing apparatus connected to the data processing apparatus. The data processing apparatus further includes a memory reader reading information stored in the external memory, a processor performing the process specified by the designation information on the document data or the image data, and a controller controlling an operation of each portion of the data processing apparatus. The controller includes a connection determination portion determining an attachment state of the external memory to the connector. In response to the connection determination portion determining that the external memory is connected to the connector, the controller controls the memory reader to read the designation information from the external memory. The controller outputs an instruction corresponding to the process specified by the read designation information to the processor.

Preferably, the data processing apparatus further includes a storage portion storing a list in which information for specifying each of the plurality of prescribed processes and a content of each of the plurality of processes are associated with each other. The controller outputs the instruction corresponding to the process specified by the designation information to the processor, based on the designation information and the list.

Further preferably, the designation information includes apparatus user information for specifying a user of the data processing apparatus. The list associates the user of the data processing apparatus with the content of the process. The controller outputs to the processor the instruction corresponding to the process associated with the user of the data processing apparatus as specified by the user information, based on the designation information and the list.

Preferably, the designation information is an automatic execution job to allow the data processing apparatus to execute the process. When the memory reader reads the automatic execution job, the controller outputs to the processor an instruction corresponding to the process which the automatic execution job allows the data processing apparatus to execute.

Preferably, the controller includes an authentication portion recording an execution count of the process specified by the designation information. When the execution count is equal to or lower than a prescribed count, the controller outputs to the processor the instruction corresponding to the process specified by the read designation information.

Preferably, the external memory stores memory user information for specifying a user of the external memory. The data processing apparatus further includes a storage portion storing apparatus user information for specifying a user of the data processing apparatus. When the controller determines that the memory user information matches the apparatus user information, the controller outputs to the processor the instruction corresponding to the process specified by the read designation information.

Preferably, the external memory further stores memory user information for specifying a user of the external memory. The data processing apparatus further includes an input portion accepting an external input. When the controller determines that the memory user information matches the input, the controller outputs to the processor the instruction corresponding to the process specified by the read designation information.

Preferably, the data processing apparatus further includes an input portion accepting an external input and a storage portion storing apparatus user information for specifying a user of the data processing apparatus. When the controller determines that the apparatus user information matches the input, the controller outputs to the processor the instruction corresponding to the process specified by the read designation information.

A data processing apparatus in accordance with the present invention executes a process based on designation information stored in an external memory in response to the external memory being connected to the data processing apparatus. As a result, the data processing apparatus can execute the process without the user's inputting the settings of the process.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a flowchart showing a flow of a process performed by the controller in recording of an automatic execution job.

DESCRIPTION OF THE PREFERRED EMBODIMENTS

Figure 1:
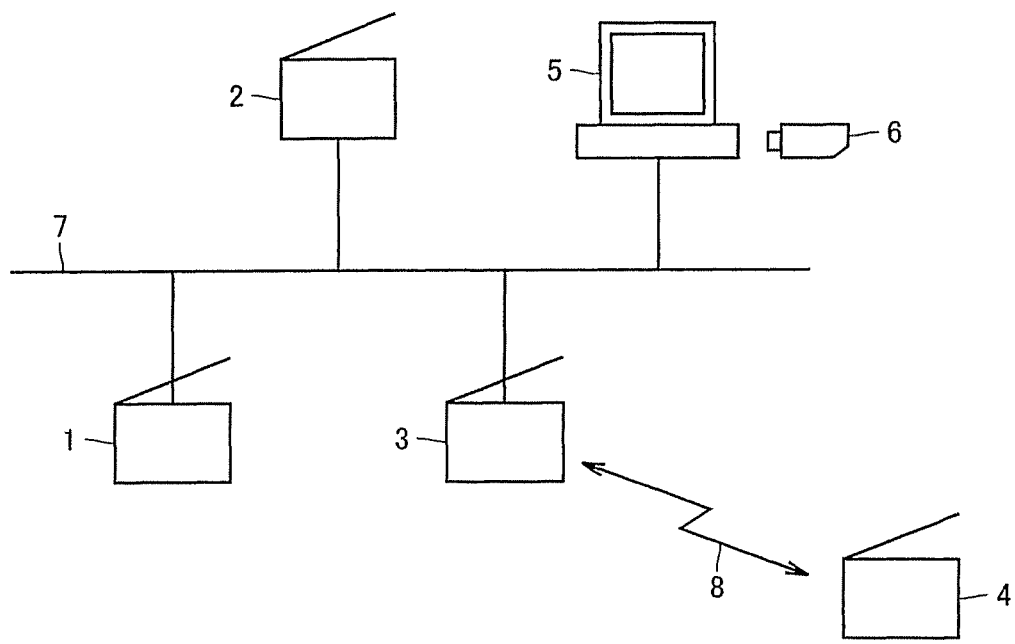
FIG. 1 is a schematic diagram showing a configuration of a data processing system.

In the following, the embodiments of the present invention will be described with reference to the figures. In the following description, the same components are denoted with the same reference characters. Their designations and functions are also the same. Therefore, the detailed description thereof will not be repeated.

First Embodiment (1. Overview)

A configuration of a data processing system including a data processing apparatus in accordance with a first embodiment will be described with reference to FIG. 1. The data processing system includes a first data processing apparatus 1, a second data processing apparatus 2, a third data processing apparatus 3, a fourth data processing apparatus 4, a computer 5, and an external memory 6.

First data processing apparatus 1, second data processing apparatus 2, third data processing apparatus 3, and computer 5 are connected to one another through a network cable 7. Here, network cable 7 is a LAN (Local Area Network) cable. Furthermore, third data processing apparatus 3 and fourth data processing apparatus 4 are connected to each other through a telephone line 8. External memory 6 is attached to and removed from computer 5.

First data processing apparatus 1, second data processing apparatus 2, third data processing apparatus 3, and fourth data processing apparatus 4 perform designated processes on data such as document data or image data and output process results. For example, when a designated process is a print process, each data processing apparatus prints document data or image data on a printing medium such as paper. On the other hand, when a designated process is a mail process, each data processing apparatus transmits document data stored in a BOX or the like by email to another apparatus.

In the present embodiment, each data processing apparatus is an MFP including the functions of a printer, a scanner, a copier, a facsimile and the like. Here, the data processing apparatus is not limited to an MFP. The data processing apparatus may be a printer, a scanner, a copier, or the like having a single function. However, one of the objects of the present invention is to save the user time and trouble of inputting the settings. Therefore, the present invention is preferably adopted to apparatuses such as MFP that require many setting inputs. In the following description, each data processing apparatus is an MFP.

First data processing apparatus 1, second data processing apparatus 2, and third data processing apparatus 3 connected to each other via network cable 7 transmit and receive a variety of information to and from each other. For example, these apparatuses transmit and send emails. Third data processing apparatus 3 and fourth data processing apparatus 4 connected via telephone line 8 perform facsimile transmission and reception to and from each other. Computer 5 is a general computer. Computer 5 transmits and receives a variety of information to and from first data processing apparatus 1, second data processing apparatus 2, and third data processing apparatus 3 through network cable 7.

Figure 2:
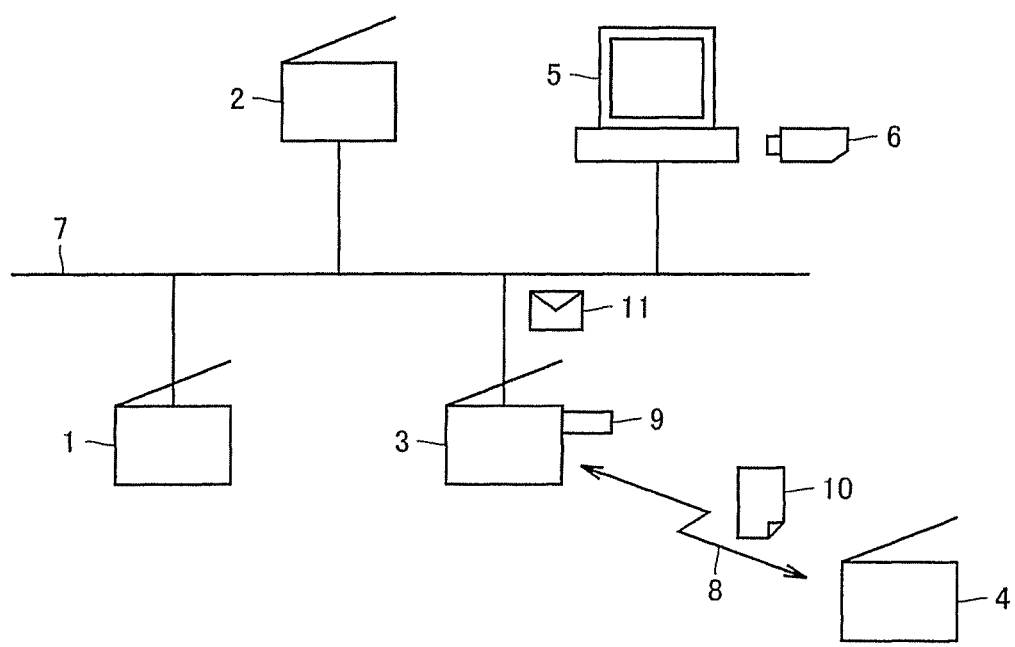
FIG. 2 is a diagram illustrating an exemplary manner of an operation of the data processing system.

Referring to FIG. 2, a manner of an operation of the data processing system will be described. When the user connects an external memory 9 to third data processing apparatus 3, third data processing apparatus 3 recognizes that external memory 9 has been connected. Then, third data processing apparatus 3 reads designation information or image data stored in external memory 9 from external memory 9. Such recognition of connection of external memory 9 and reading of data stored in external memory 9 are realized using a conventional technique.

Here, "designation information" refers to information to specify a process to be executed by each data processing apparatus. More specifically, designation information includes a process condition of a process to be executed by each data processing apparatus. For example, the designation information to specify a data storing process includes a storage location of data to be processed. The designation information is described in a format common to a plurality of data processing apparatuses included in the data processing system.

In the present embodiment, external memory 9 is a USB (Universal Serial Bus) memory. Here, external memory 9 may be any storage device that can be carried by the user and is not limited to a USB memory. The user carries external memory 9 with him/her and allows the data processing apparatus to start execution of a process by connecting external memory 9 to the data processing apparatus that he/she wants to use.

Here, by way of example, the designation information designates a job in which third data processing apparatus 3 transmits a document 10 to fourth data processing apparatus 4 by facsimile and a job in which third data processing apparatus 3 transmits an email 11 to computer 5. Here, a "job" refers a series of processes executed by a data processing apparatus.

Here, third data processing apparatus 3 transmits document 10 to fourth data processing apparatus 4 by facsimile based on the designation information read from external memory 9. Furthermore, third data processing apparatus 3 transmits email 11 to computer 5.

It is noted that a storage location of data such as document 10 or email 11 to be processed is predetermined depending on the kind of process or is set in relation to a process. The data to be processed may be stored in third data processing apparatus 3 or may be stored in external memory 9.

(2. Functional Configuration of Data Processing Apparatus)

Figure 3:
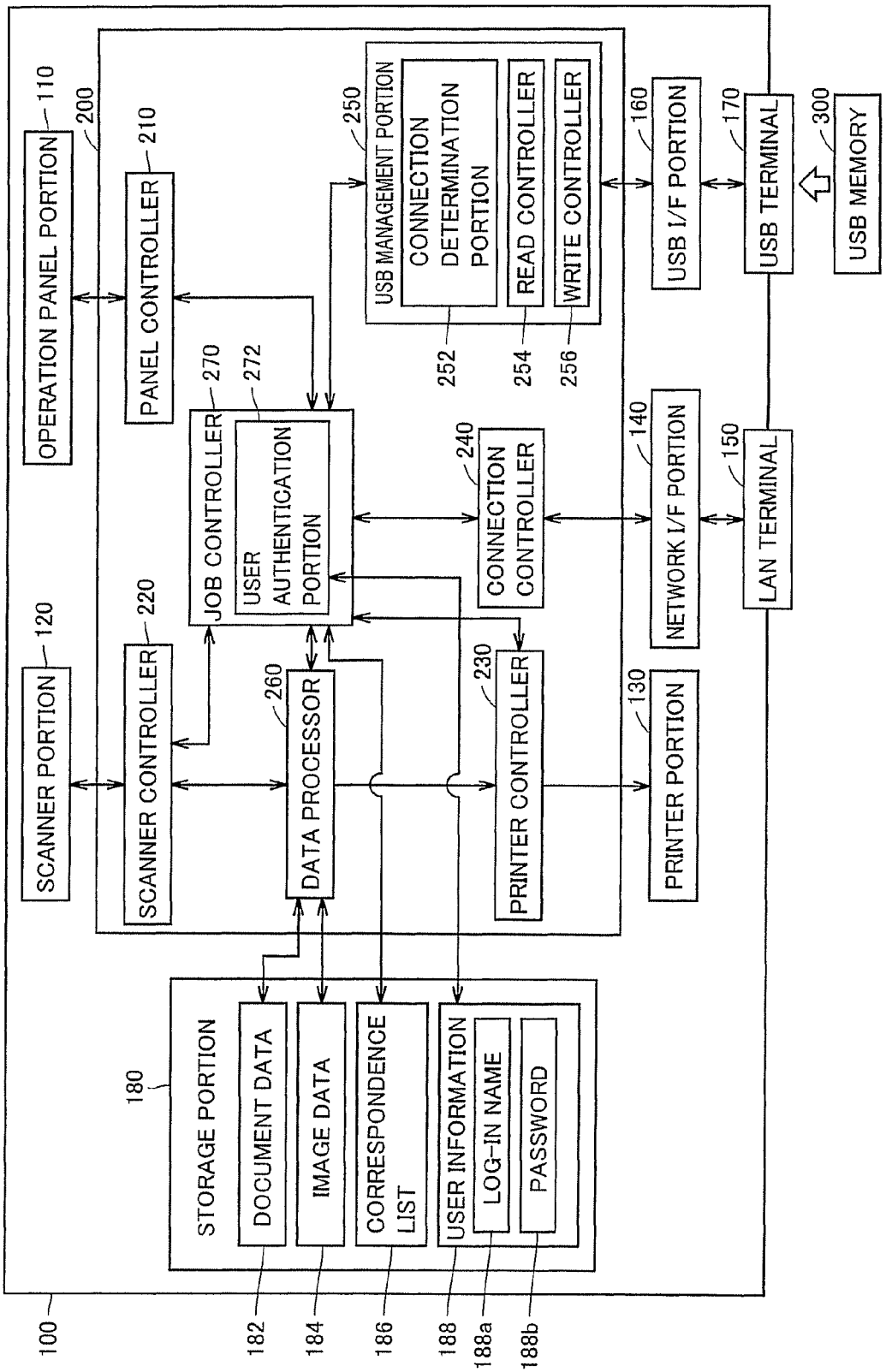
FIG. 3 is a block diagram showing a functional configuration of a data processing apparatus in accordance with a first embodiment.

In the following, with reference to FIG. 3, a functional configuration of a data processing apparatus 100 will be described. It is noted that, here, the first to fourth data processing apparatuses are collectively called data processing apparatus 100 for illustration. However, the configurations of the first to fourth data processing apparatuses are not necessarily the same.

Data processing apparatus 100 includes an operation panel portion 110, a scanner portion 120, a printer portion 130, a network interface portion 140 (referred to as network I/F portion 140 hereinafter), a LAN terminal 150, a USB interface portion 160 (referred to as USB I/F portion 160 hereinafter), a USB terminal 170, a storage portion 180, and a controller 200.

Operation panel portion 110 accepts an instruction from the user. Scanner portion 120 scans an original to generate image data. Printer portion 130 prints data in data processing apparatus 100 or data received from the outside on a printing medium such as paper.

A LAN cable is connected to LAN terminal 150. Network I/F portion 140 performs a data transmission/reception process between data processing apparatus 100 and another apparatus connected to data processing apparatus 100 through LAN terminal 150 and the LAN cable.

A USB memory 300 (external memory 9 in FIG. 2) is connected to USB terminal 170. USB I/F portion 160 reads data from USB memory 300. Furthermore, USB I/F portion 160 writes data in USB memory 300.

Storage portion 180 stores document data 182, image data 184, a correspondence list 186, and user information 188.

Document data 182 is a target of a job such as printing by printer portion 130 or mail transmission by network I/F portion 140. Data processing apparatus 100 obtains document data 182 mainly through network I/F portion 140 or USB I/F portion 160.

Image data 184 is a target of a job such as printing by printer portion 130 or mail transmission by network I/F portion 140. Data processing apparatus 100 obtains image data 184 typically through network I/F portion 140 or USB I/F portion 160 or by scanner portion 120.

Correspondence list 186 is information representing the relation between information for specifying a process such as a process name and a process content. It is assumed that correspondence list 186 is common to a plurality of data processing apparatuses included in the data processing system. A specific example of correspondence list 186 will be described later.

User information 188 is information for specifying the user of data processing apparatus 100. User information 188 includes a log-in name 188*a* and a password 188*b*.

Controller 200 controls the operation of each portion of data processing apparatus 100. Controller 200 includes a panel controller 210, a scanner controller 220, a printer controller 230, a connection controller 240, a USB management portion 250, a data processor 260, and a job controller 270.

The functions of controller 200 are realized by software executed by a CPU (Central Processing Unit). Here, a part or all of the functions of controller 200 may be realized by hardware.

Panel controller 210 transmits to job controller 270 a signal based on an input accepted by operation panel portion 110. Scanner controller 220 controls the operation of scanner portion 120. Printer controller 230 controls the operation of printer portion 130.

Connection controller 240 controls data transmission/reception by network I/F portion 140. USB management portion 250 controls the operation of USB I/F portion 160.

USB management portion 250 has a connection determination portion 252, a read controller 254, and a write controller 256. Connection determination portion 252 determines whether USB memory 300 is connected to USB terminal 170. Read controller 254 controls reading of data from USB memory 300. Write controller 256 controls writing of data into USB memory 300.

Data processor 260 registers in storage portion 180 image data obtained by scanner portion 120 scanning an original. In addition, data processor 260 reads document data 182 and image data 184 stored in storage portion 180 and sends the read document data 182 and image data 184 to printer controller 230. Furthermore, data processor 260 records data obtained from USB memory 300 or the connected other apparatuses into recording portion 180 or transmits data in storage portion 180 to job controller 270, based on an instruction from job controller 270.

Job controller 270 issues an instruction to allow each portion of data processing apparatus 100 (for example, scanner controller 220, printer controller 230, connection controller 240, USB management portion 250, or data processor 260) to execute a designated process, based on an instruction accepted by operation panel portion 110 or information read by USB management portion 250.

Furthermore, job controller 270 has a user authentication portion 272. User authentication portion 272 compares user information 188 with user information stored in USB memory 300 for authenticating the user of data processing apparatus 100. In addition, user authentication portion 272 compares user information 188 or user information stored in USB memory 300 with the information input by the user on operation panel portion 110 for performing user authentication.

Further, user authentication portion 272 registers in USB memory 300 a process execution count of a designated process. The process execution count is used when data processing apparatus 100 determines whether a process specified by designation information is to be executed. The process execution count will be detailed later.

(3. Information for Use by Data Processing Apparatus)

The information stored by USB memory 300 and storage portion 180 in accordance with the first embodiment will be described with reference to FIG. 4.

Job designation information 400 is stored in USB memory 300. In the present embodiment, job designation information 400 designates a plurality of kinds of jobs. However, the job designation information may designate only one kind of job.

A number for specifying a job (job ID), a region for designating the kind of process to be executed, and a region for designating data to be processed are provided in job designation information 400, for each job. The process executed by data processing apparatus 100 is specified based on the information in these regions.

Job designation information 400 is described in a common format which can be recognized in a plurality of data processing apparatuses included in the data processing system. Therefore, when USB memory 300 in which such job designation information 400 is stored is connected, any data processing apparatus in the system executes the process corresponding to job designation information 400.

Figure 4:
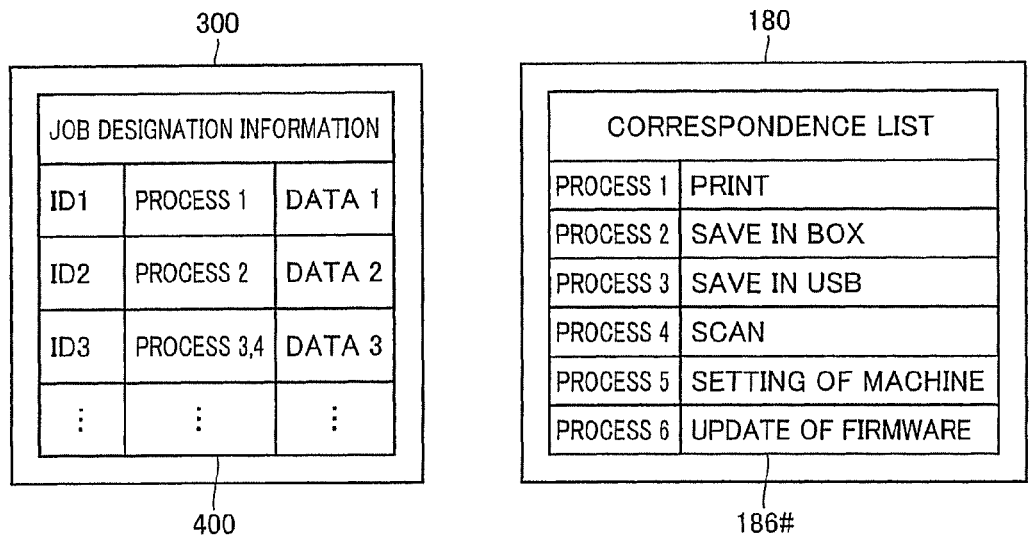
FIG. 4 is a diagram representing information stored by a USB memory and a storage portion in accordance with the first embodiment.

It is noted that as in the job of ID3 shown in FIG. 4, it can be set in one job that data processing apparatus 100 is allowed to execute a plurality of kinds of processes. Furthermore, in the region for data designating to be processed, the data stored in USB memory 300 may be set as a process target of a job. The data stored in storage portion 180 may be set as a process target of a job.

Storage portion 180 stores correspondence list 186#. Correspondence list 186# includes a number for specifying a process (process ID) and the content of the process. In correspondence list 186# shown in FIG. 4, a process 1 corresponds to printing of designated data. A process 2 corresponds to saving of designated data into a BOX. A process 3 corresponds to saving of designated data into a USB memory. A process 4 corresponds to scanning. A process 5 corresponds to settings of the machine. A process 6 corresponds to update of firmware.

When recognizing connection of USB memory 300 to USB terminal 170, controller 200 of data processing apparatus 100 reads job designation information 400 stored in USB memory 300. Furthermore, controller 200 searches correspondence list 186# for the process designated by job designation information 400. In addition, controller 200 outputs an instruction to execute the designated process to scanner portion 120 or printer portion 130. The destination of the instruction differs depending on the content of the process designated by job designation information 400.

It is noted that job designation information 400 or correspondence list 186# is not limited to the foregoing. Job designation information 400 may at least include information for specifying a process executed in data processing apparatus 100 (a process name, a process ID, or the like). Further, correspondence list 186# may at least associate information for specifying a process with the process content thereof. For example, the data configuration may be such that job designation information 400 designates only a process name and storage portion 180 stores correspondence list 186# in which the process content and data to be processed are related with the process name.

Figure 5:
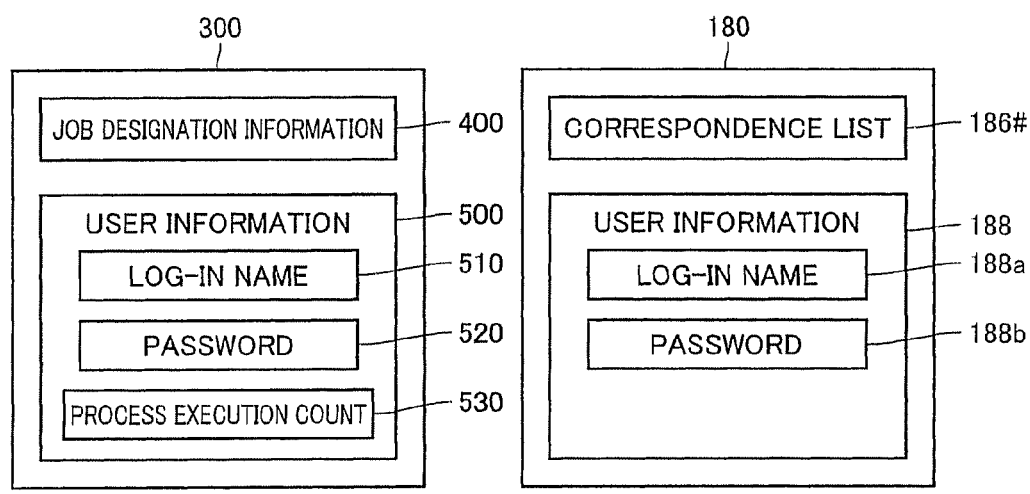
FIG. 5 is a diagram representing information stored by the USB memory and the storage portion in accordance with the first embodiment in user authentication.

Furthermore, data processing apparatus 100 in accordance with the present embodiment performs user authentication as necessary. For this purpose, user information is stored in USB memory 300 and storage portion 180. Information required in performing user authentication will be described with reference to FIG. 5.

USB memory 300 stores job designation information 400 and user information 500. User information 500 is information for specifying a user. Here, the user information includes a log-in name 510, a password 520, and a process execution count 530. Process execution count 530 represents the number of times data processing apparatus 100 completes a designated process when USB memory 300 is connected to data processing apparatus 100. Process execution count 530 is written in USB memory 300 by controller 200 of data processing apparatus 100. Controller 200 updates process execution count 530 when a designated process is completed.

Storage portion 180 stores correspondence list 186# and user information 188. User information 188 includes log-in name 188a and password 188b. It is noted that storage portion 180 may store user information for a plurality of users.

It is noted that in the present embodiment a log-in name and a password are used as user information. However, instead of them, other information that can be used for user authentication may be used as user information. For example, fingerprint data or the like may be used as user information. Alternatively, only one of a log-in name and a password may be used as user information. Which user information is used is preferably determined depending on the degree of security required in execution of a process.

(4. Process Flow)

Figure 6:
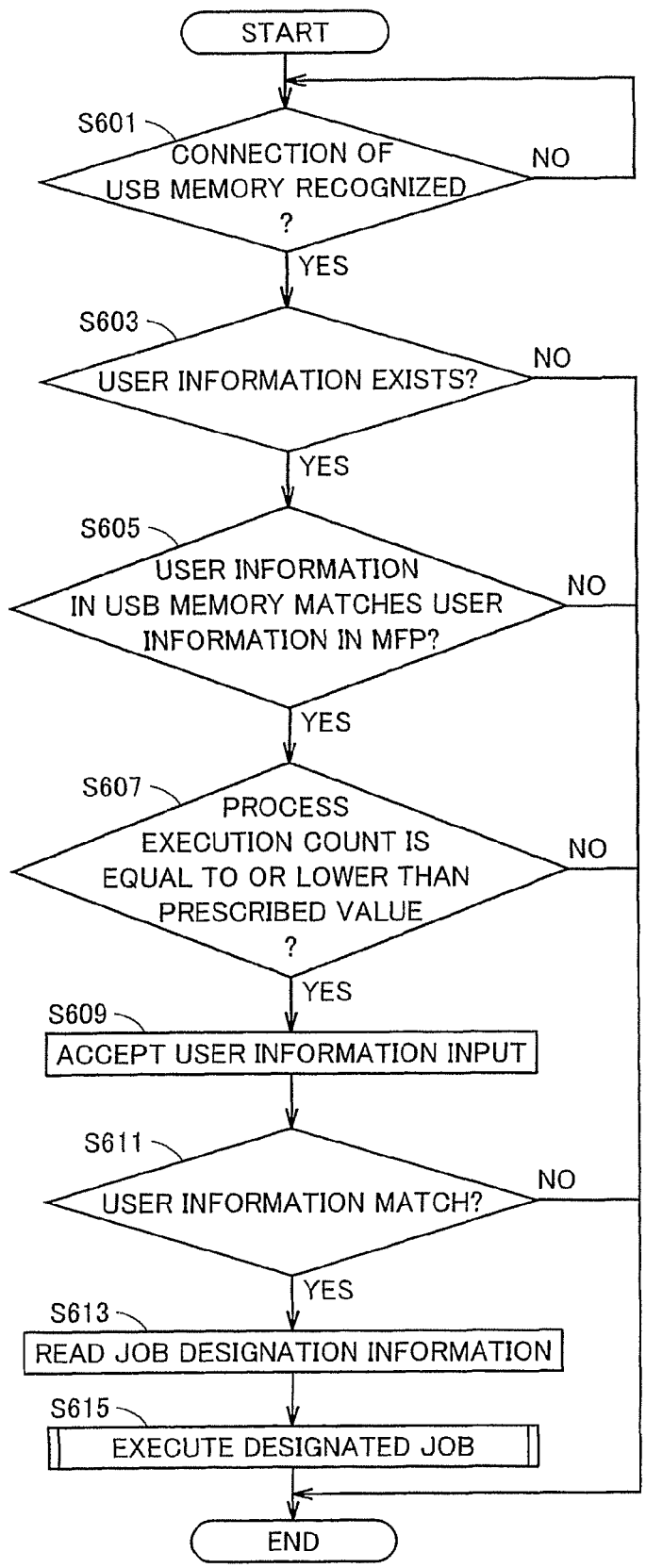
FIG. 6 is a flowchart showing a flow of a process performed by a controller in accordance with the first embodiment.

A flow of a process performed by controller 200 in accordance with the first embodiment upon attachment of USB memory 300 will be described with reference to FIG. 6.

In step S601, controller 200 determines whether connection of USB memory 300 to USB terminal 170 is recognized. If connection of USB memory 300 is not recognized (NO in step S601), controller 200 repeats the process in step S601.

If connection of USB memory 300 is recognized (YES in step S601), in step S603, controller 200 reads information from the connected USB memory 300. Then, controller 200 determines whether user information is stored in USB memory 300 based on the read information.

If user information is not stored (NO in step S603), controller 200 ends the process without giving an instruction to execute a job.

If user information is stored (YES in step S603), in step S605, controller 200 determines whether the user information stored in USB memory 300 matches the user information stored in storage portion 180 of data processing apparatus 100. It is noted that if a plurality of user information are stored in storage portion 180, controller 200 determines whether the user information stored in USB memory 300 matches any of the user information stored in storage portion 180.

If the user information stored in USB memory 300 does not match any of the user information stored in storage portion 180 (NO in step S605), controller 200 ends the process.

In other words, controller 200 gives an instruction to execute a job designated by USB memory 300 only when USB memory 300 in which the user information that matches the user information stored in storage portion 180 is stored is connected. Therefore, as long as a system manager or the like registers in data processing apparatus 100 the information of only the user that may use data processing apparatus 100, it can be avoided that an outsider operates data processing apparatus 100. For example, a system manager registers only the members of groups or departments that use data processing apparatus 100 in data processing apparatus 100 for use in the office.

If the user information stored in the USB memory matches any of the user information stored in storage portion 180 (YES in step S605), controller 200 determines whether the process execution count stored in USB memory 300 is equal to or lower than a prescribed value, in step S607. The prescribed value is a predetermined value and is stored in storage portion 180. It is noted that the prescribed value may be changed by a system manager or a serviceman.

If the process execution count exceeds a prescribed value (NO in step S607), controller 200 ends the process.

Data processing apparatus 100 can avoid executing an unnecessary process by managing whether a job is to be executed or not depending on the process execution count. For example, if one data processing apparatus has already executed a printing process, it is inconvenient that another data processing apparatus performs the same printing process again when USB memory 300 is connected.

Then, for example, the inconvenience as described above can be avoided by setting a prescribed value to "once." Here, connection of USB memory 300 second and subsequent times does not allow data processing apparatus 100 to execute a designated process. Furthermore, the cost management for each user becomes easier by managing the process execution count.

If the process execution count is equal to or lower than a prescribed value (YES in step S607), controller 200 allows a window for prompting for input of user information to appear on operation panel portion 110, in step S609.

In step S611, controller 200 determines whether the input accepted by operation panel portion 110 matches the user information stored in USB memory 300.

If the input user information does not match the user information stored in USB memory 300 (NO in step S611), controller 200 ends the process. In this manner, data processing apparatus 100 allows the user to log in by inputting the user information, thereby improving security. For example, the risk of a third party picking up and using the external memory (USB memory 300), which the user accidentally dropped, for the wrong purpose is eliminated.

If the input user information matches the user information stored in USB memory 300 (YES in step S611), controller 200 reads job designation information 400 from USB memory 300, in step S613.

In step S615, controller 200 instructs each portion to execute a job designated by job designation information 400. The instruction content differs depending on job designation information 400 and the content of the process registered in correspondence list 186#.

Here, in the present embodiment, data processing apparatus 100 executes a job through the authentication by whether the user information stored in USB memory 300 matches the user information stored in data processing apparatus 100, the authentication by the process execution count, and the authentication by user input. However, data processing apparatus 100 may omit a part or all of theses authentications.

For example, even if the authentication by user input is omitted, a job is not executed over a prescribed count as long as the authentication by the process execution count is done. In this case, the user can request a third party for a process without giving personal information such as a password to the third party.

Further, in the configuration as described above, the information input by the user is compared with the user information stored in USB memory 300. However, controller 200 may determine whether the input information matches the user information stored in storage portion 180.

Moreover, when controller 200 does not perform the authentication by whether the user information stored in USB memory 300 matches the user information stored in the data processing apparatus, controller 200 may determine whether the input information matches both of the user information stored in USB memory 300 and the user information stored in storage portion 180. Such double authentication enhances the security.

As described above, data processing apparatus 100 in accordance with the present embodiment executes the designated process at the time when user authentication is completed. Thus, data processing apparatus 100 may update the process execution count at the time when a user logs in to the data processing apparatus, namely, when user authentication is completed. Furthermore, data processing apparatus 100 may register a process execution count for each job designated by the job designation information.

Second Embodiment

In the first embodiment, job designation information 400 stored in USB memory 300 includes a process name included in a job. Then, correspondence list 186# stored in storage portion 180 of data processing apparatus 100 associates a process name with a process content. The data processing system in accordance with the first embodiment realizes execution of a job in response to USB memory 300 being connected to data processing apparatus 100 by combining such job designation information 400 with correspondence list 186#.

In the second embodiment, not the job designation information as described above but user information is used as designation information to specify a process to be executed by data processing apparatus 100. Here, a correspondence list in which a user is associated with a process content is used.

The configuration of the data processing system and the functional configuration of data processing apparatus 100 in accordance with the second embodiment are similar to those of the first embodiment.

Figure 7:
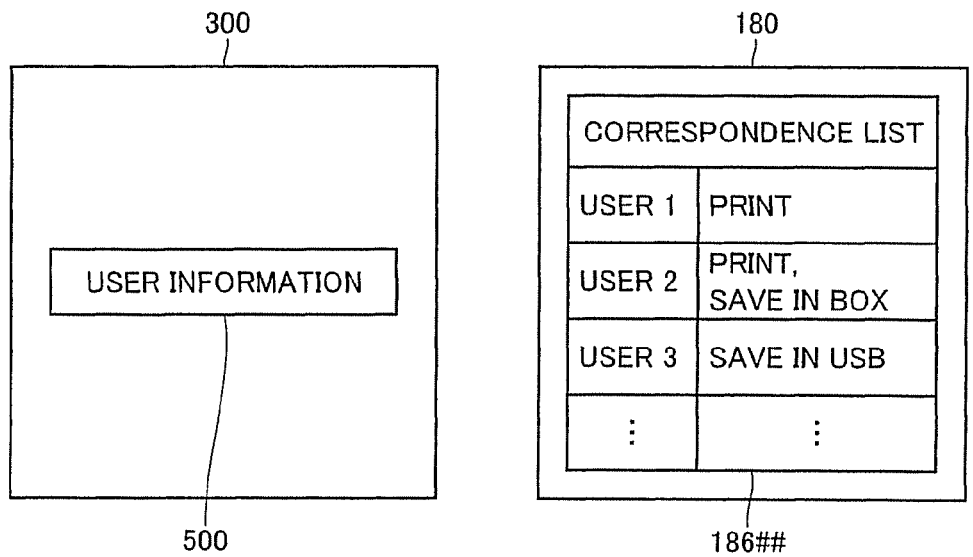
FIG. 7 is a diagram representing information stored by the USB memory and the storage portion in accordance with a second embodiment.

In the second embodiment, the information stored in USB memory 300 and storage portion 180 is shown in FIG. 7.

USB memory 300 stores user information 500. Furthermore, storage portion 180 stores correspondence list 186## in which a user name is related to the content of a process.

Data processing apparatus 100 reads user information 500 stored in USB memory 300 when recognizing connection of USB memory 300 to USB terminal 170. Data processing apparatus 100 searches correspondence list 186## for the process corresponding to the read user information 500 and executes the process corresponding to user information 500.

Figure 8:
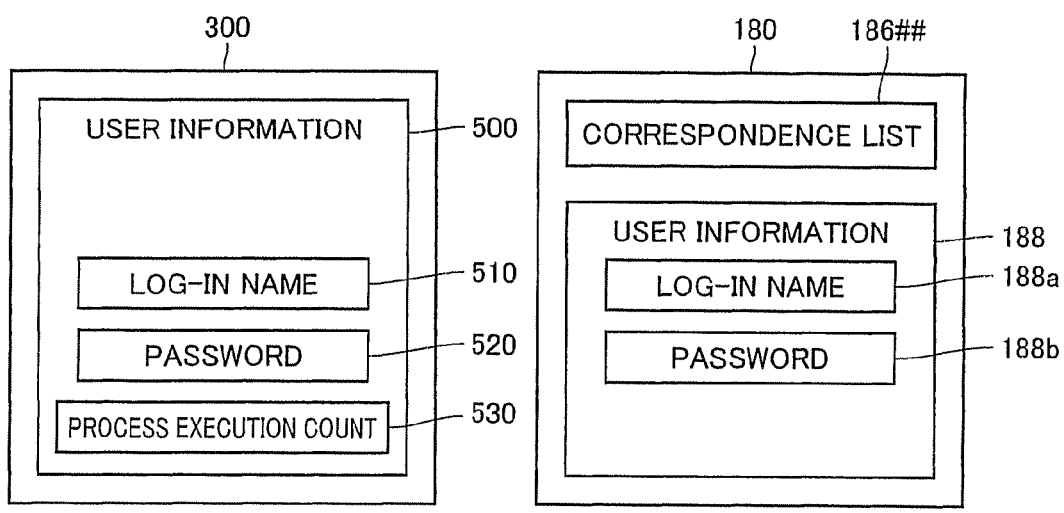
FIG. 8 is a diagram representing information stored by the USB memory and the storage portion in accordance with the second embodiment in user authentication.

Similarly to the first embodiment, data processing apparatus 100 performs user authentication as necessary. Information required in performing user authentication will be described with reference to FIG. 8.

User information 500 stored by USB memory 300 includes log-in name 510, password 520, and process execution count 530.

Storage portion 180 stores correspondence list 186## and user information 188. User information 188 includes log-in name 188a and password 188b. Here, storage portion 180 may store user information for a plurality of users.

Similarly to the first embodiment, another information that can be used to authenticate a user may be used as user information. Furthermore, similarly to the first embodiment, a process execution count may be stored in storage portion 180.

Figure 9:
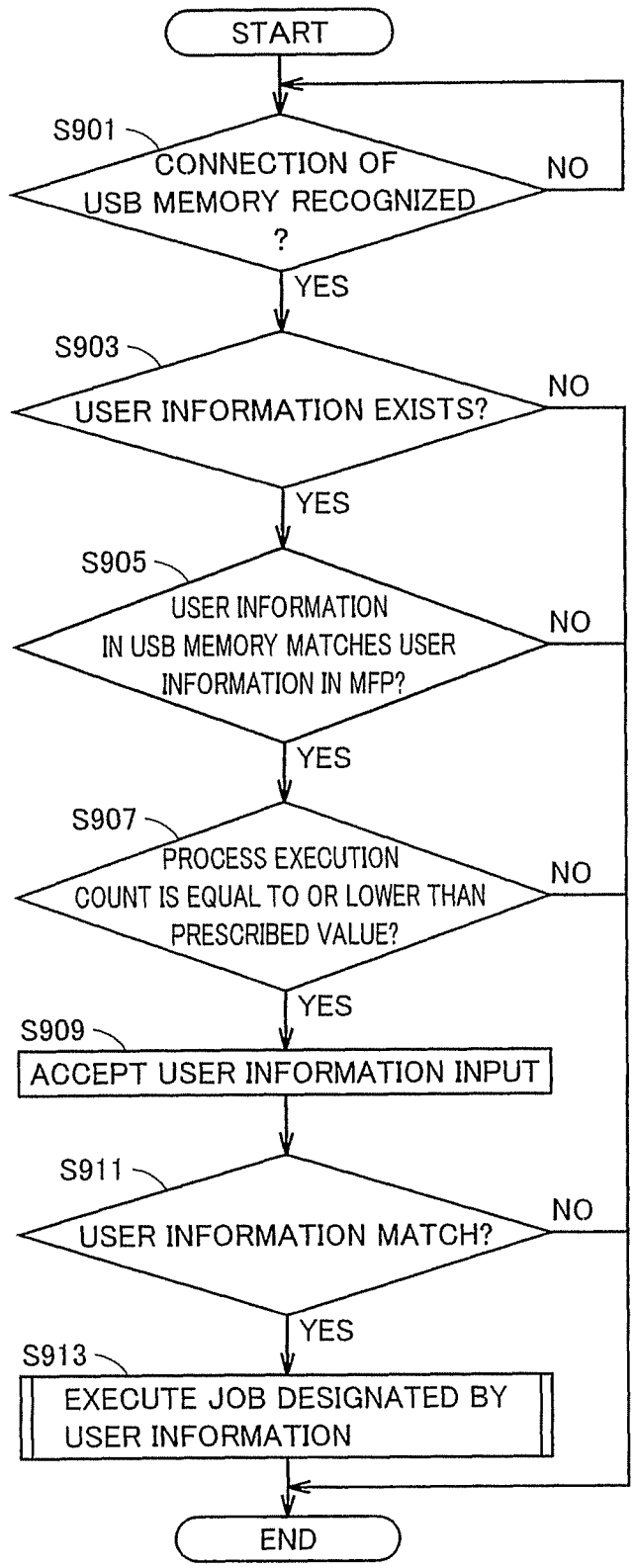
FIG. 9 is a flowchart showing a flow of a process performed by the controller in accordance with the second embodiment.

A flow of a process performed by controller portion 200 in accordance with the second embodiment upon attachment of USB memory 300 will be described with reference to FIG. 9.

In step S901, controller 200 determines whether connection of USB memory 300 to USB terminal 170 is recognized. If connection of USB memory 300 is not recognized (NO in step S901), controller 200 repeats the process in step S901.

If connection of the USB memory is recognized (YES in step S901), in step S903, controller 200 reads information from the connected USB memory 300 to determine whether user information is stored in USB memory 300.

If user information is not stored (NO in step S903), controller 200 ends the process.

If user information is stored (YES in step S903), controller 200 determines whether the user information stored in USB memory 300 matches the user information stored in storage portion 180 of data processing apparatus 100, in step S905. Here, if a plurality of user information are stored in storage portion 180, controller 200 determines whether the user information stored in USB memory 300 matches any of the user information stored in storage portion 180.

If the user information stored in USB memory 300 does not match any of the user information stored in storage portion 180 (NO in step S905), controller 200 ends the process.

In other words, controller 200 gives an instruction to execute a job only when USB memory 300 in which the user information that matches the user information stored in storage portion 180 is stored is connected. Therefore, as long as a system manager or the like registers in data processing apparatus 100 the information of only the user that may use data processing apparatus 100, it can be avoided that an outsider operates data processing apparatus 100. For example, a system manager registers only the members of groups or departments that use data processing apparatus 100 in data processing apparatus 100 for use in the office.

If the user information stored in USB memory 300 matches the user information stored in storage portion 180 (YES in step S905), controller 200 determines whether the process execution count stored in USB memory 300 is equal to or lower than a prescribed value, in step S907. The prescribed value is a predetermined value and is stored in storage portion 180. Here, the prescribed value may be changed by a system manager, a serviceman, or the like.

If the process execution count exceeds a prescribed value (NO in step S907), controller 200 ends the process.

Data processing apparatus 100 can avoid executing an unnecessary process by managing whether a job is to be executed or not depending on a process execution count. For example, if one data processing apparatus has already executed a printing process, it is inconvenient that another data processing apparatus performs the same printing process again when a USB memory is connected. Then, the inconvenience as described above can be avoided, for example, by setting a prescribed value to "once." Here, connection of USB memory 300 second and subsequent times does not cause data processing apparatus 100 to execute a designated job. Furthermore, the cost management for each user becomes easier by managing the process execution count.

If the process execution count is equal to or lower than a prescribed value (YES in step S907), controller 200 allows a window for prompting for input of user information to appear on operation panel 110, in step S909.

In step S911, controller 200 determines whether the input accepted by operation panel portion 110 matches the user information stored in USB memory 300.

If the input user information does not match the user information stored in USB memory 300 (NO in step S911), controller 200 ends the process. In this manner, data processing apparatus 100 allows the user to log in by inputting user information, thereby improving security. For example, the risk of a third party picking up and using the external memory (USB memory 300), which the user accidentally dropped, for the wrong purpose is eliminated.

If the input user information matches the user information stored in USB memory 300 (YES in step S911), controller 200 instructs each portion to execute a job designated by the user information, in step S913. The instruction content differs depending on the kind of job.

It is noted that, similarly to the first embodiment, any modification can be made, as a matter of course, such as omitting a part or all of the authentication by whether the user information stored in USB memory 300 matches the user information stored in data processing apparatus 100, the authentication by a log-in count, and the authentication by user input. Furthermore, a modification similar to the first embodiment can also be made for the method of updating a process execution count.

Third Embodiment

In the first embodiment and the second embodiment, a correspondence list in which the information for specifying the kind of process to be executed and the process content to be executed is stored in storage portion 180. Data processing apparatus 100 in accordance with these embodiments determines the process content to be executed with reference to the correspondence list.

By contrast, in the third embodiment, "automatic execution job" is stored in USB memory 300. The automatic execution job includes information indicative of an apparatus to execute a process and a process executed by the apparatus. Furthermore, the automatic execution job is a kind of automatic execution file. In other words, data processing apparatus 100 reads an automatic execution job and then automatically executes a process indicated by the automatic execution job. Here, the content of the automatic execution job is described in a common specification for each apparatus included in the system.

The configuration of the data processing system and the functional configuration of data processing apparatus 100 in accordance with the third embodiment are similar to those of the first embodiment.

An example of information stored in USB memory 300 in accordance with the third embodiment will be described with reference to FIG. 10.

USB memory 300 stores an automatic execution job 1000, target data 1010 which is a process target of a job, and user information 500.

Automatic execution job 1000 includes an item indicative of an apparatus to execute a process and an item indicative of a process to be executed by the apparatus. Here, apparatus information such as "apparatus 1" of the item indicative of an apparatus may not indicate one apparatus but may designate a group consisting of a plurality of apparatuses. For example, a group consisting of apparatuses that can perform a certain process may be designated. Alternatively, a common group number may be given to the data processing apparatuses existing in a certain section of the office. In this manner, the user can connect USB memory 300 to any apparatus included in the group to allow the apparatus to perform a desired process. It is noted that although FIG. 10 shows the example in which automatic execution job 1000 is set for a plurality of groups, automatic execution job 1000 may be set only for one group.

Data processing apparatus 100 reads automatic execution job 1000 stored in USB memory 300 when recognizing connection of USB memory 300 to USB terminal 170. Data processing apparatus 100 executes a job according to automatic execution job 1000.

Figure 10:
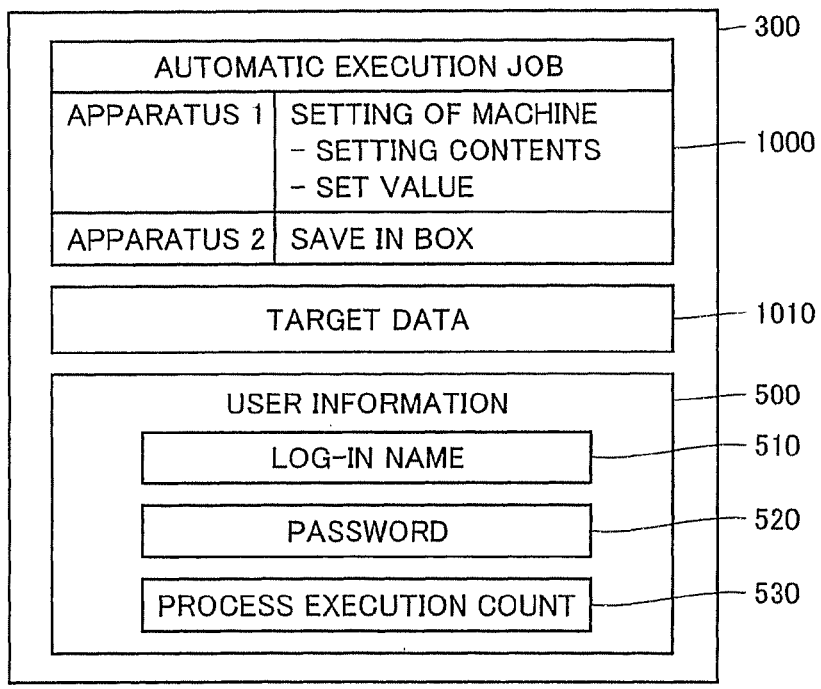
FIG. 10 is a diagram illustrating an example of information stored by the USB memory in accordance with a third embodiment.

According to automatic execution job 1000 shown in FIG. 10, apparatus 1 changes the settings of the machine based on the setting content and the content indicated by a set value. Apparatus 2 saves target data 1010 in a BOX (storage region) in storage portion 180.

Target data 1010 is document data, image data, or the like. A process for target data 1010 is performed by data processing apparatus 100. Here, the data that is a target of a job may be data stored not in USB memory 300 but in storage portion 180.

User information 500 includes log-in name 510, password 520, and process execution count 530. Similarly to the first embodiment and the second embodiment, user information 500 is not limited thereto. Furthermore, process execution count 530 may be stored in storage portion 180 of data processing apparatus 100.

According to automatic execution job 1000 shown in FIG. 10, each apparatus executes one process. However, the automatic execution job may instruct each apparatus to execute a plurality of processes. Such an example will be described with reference to FIG. 11.

Figure 11:
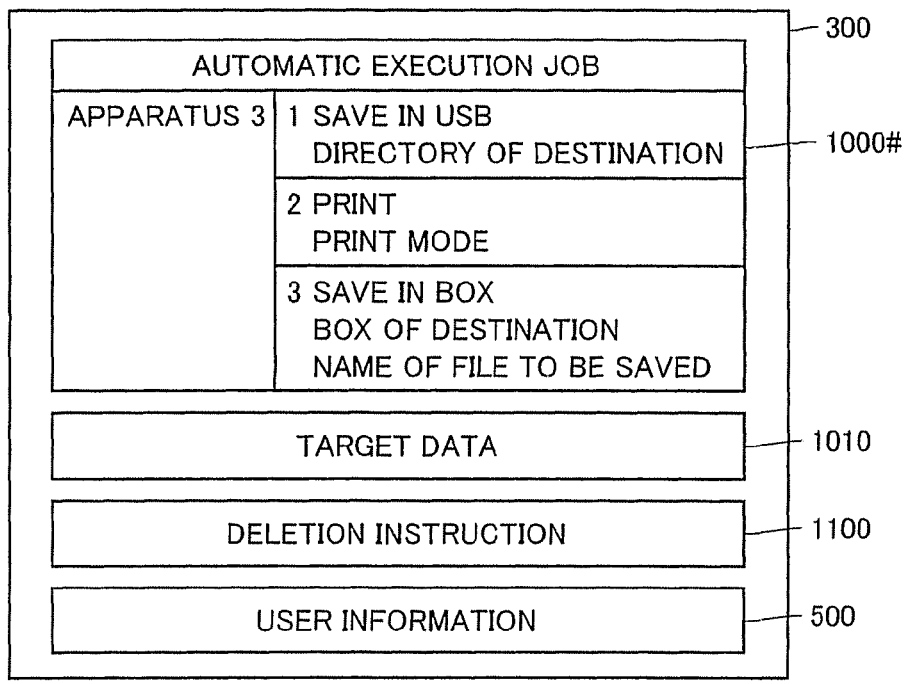
FIG. 11 is a diagram illustrating another example of information stored by the USB memory in accordance with the third embodiment.

Referring to FIG. 11, USB memory 300 stores an automatic execution job 1000#, target data 1010, and a deletion instruction 1100, and user information 500.

According to automatic execution job 1000#, apparatus 3 saves data in a destination directory as designated in USB memory 300. Furthermore, apparatus 3 prints data in a designated print mode. In addition, apparatus 3 saves data in a destination BOX as designated under a designated name. Here, apparatus 3 performs saving of data in USB memory 300, printing of data, and saving of data in BOX, in this order. In other words, apparatus 3 performs processes in the order described in automatic execution job 1000#.

Deletion instruction 1100 gives an instruction to delete target data 1010 when the apparatus designated by automatic execution job 1000# has completed the designated process. When deletion instruction 1100 is read from USB memory 300, data processing apparatus 100 deletes target data 1010 after completion of the process designated by automatic execution job 1000#. Here, data processing apparatus 100 deletes the data temporarily stored in storage portion 180 of data processing apparatus 100 during the processing or deletes target data 1010 saved in USB memory 300. Alternatively, data processing apparatus 100 may delete both data.

For example, in a case where a process is performed on a confidential document, if deletion instruction 1100 is written in USB memory 300, data processing apparatus 100 deletes the document after execution of the process. Therefore, the confidentiality is ensured.

It is noted that deletion instruction 1100 can also be recorded in USB memory 300 in order to maintain the confidentiality of data even in the first embodiment and the second embodiment.

Figure 12:
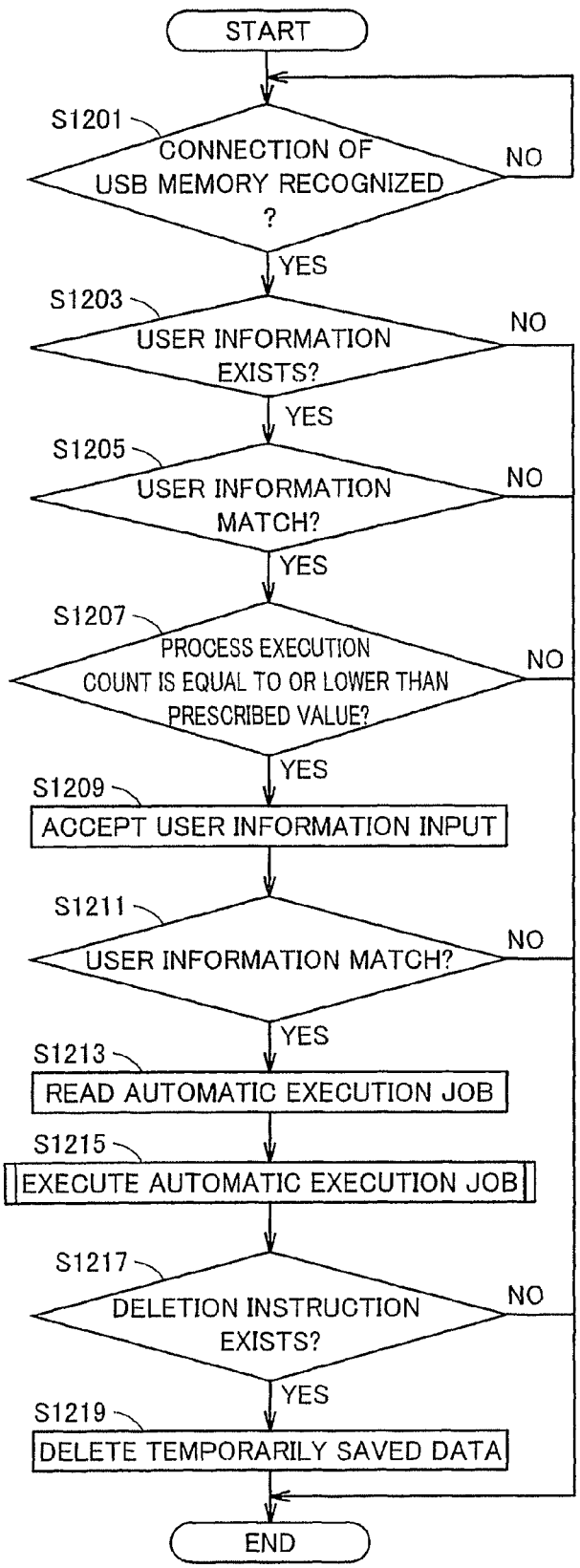
FIG. 12 is a flowchart showing a flow of a process performed by the controller in accordance with the third embodiment.

A flow of a process performed by controller 200 in accordance with the third embodiment upon attachment of USB memory 300 will be described with reference to FIG. 12.

In step S1201, controller 200 determines whether connection of USB memory 300 to USB terminal 170 is recognized. If connection of USB memory 300 is not recognized (NO in step S1201), controller 200 repeats the process in step S1201.

If connection of USB memory 300 is recognized (YES in step S1201), in step S1203, controller 200 reads information from the connected USB memory 300 to determine whether user information is stored in USB memory 300.

If user information is not stored (NO in step S1203), controller 200 ends the process without giving an instruction to execute a job.

If user information is stored (YES in step S1203), controller 200 determines whether the user information stored in the USB memory matches the user information stored in storage portion 180 of data processing apparatus 100, in step S1205. Here, if a plurality of user information are stored in storage portion 180, it is determined whether the user information stored in USB memory 300 matches any of the user information stored in storage portion 180.

If the user information stored in USB memory 300 does not match any of the user information stored in storage portion 180 (NO in step S1205), controller 200 ends the process. In other words, controller 200 gives an instruction to execute a job only when USB memory 300 in which the user information that matches the user information stored in storage portion 180 is stored is connected. Therefore, as long as a system manager or the like registers in data processing apparatus 100 the information of only the user that may use the data processing apparatus, it can be avoided that an outsider operates data processing apparatus 100. For example, in a case where data processing apparatus 100 is used in the office, only the members of groups or departments that use data processing apparatus 100 are registered in data processing apparatus 100.

If the user information stored in USB memory 300 matches any of the user information stored in storage portion 180 (YES in step S1205), controller 200 determines whether the process execution count stored in USB memory 300 is equal to or lower than a prescribed value, in step S1207. The prescribed value is a predetermined value and is stored in storage portion 180. It is noted that the prescribed value may be changed by a system manager, a serviceman, or the like.

If the process execution count exceeds a prescribed value (NO in step S1207), controller 200 ends the process.

Data processing apparatus 100 can avoid executing an unnecessary process by managing whether a job is to be executed or not depending on the process execution count. For example, if one data processing apparatus has already executed a printing process, it is inconvenient that another data processing apparatus performs the same printing process again when USB memory 300 is connected. Then, for example, the inconvenience as described above can be avoided by setting a prescribed value to "once." Here, connection of USB memory 300 second and subsequent times does not cause data processing apparatus 100 to execute a designated process. Furthermore, the cost management for each user becomes easier by managing the process execution count.

If the process execution count is equal to or lower than a prescribed value (YES in step S1207), controller 200 allows a window for prompting for input of user information to appear on operation panel 110, in step S1209

In step S1211, controller 200 determines whether the input accepted by operation panel portion 110 matches the user information stored in USB memory 300.

If the input user information does not match the user information stored in USB memory 300 (NO in step S1211), controller 200 ends the process. In this manner, the user is allowed to log in by inputting user information, thereby improving security. For example, the risk of a third party picking up and using the external memory, which the user accidentally dropped, for the wrong purpose is eliminated.

If the input user information matches the user information stored in USB memory 300 (YES in step S1211), controller 200 reads an automatic execution job from USB memory 300, in step S1213.

In step S1215, controller 200 instructs each portion to execute a job based on the content of the read automatic execution job.

In step S1217, controller 200 determines whether a deletion instruction is recorded in the USB memory.

If a deletion instruction is not recorded (NO in step S1217), controller 200 ends the process.

If a deletion instruction is recorded (YES in step S1217), controller 200 deletes the data temporarily saved in storage portion 180. Here, controller 200 may delete not the temporarily saved data but the target data recorded in USB memory 300. Furthermore, controller 200 may delete both of the temporarily saved data and the target data recorded in USB memory 300.

It is noted that such a modification as described in the first embodiment and the second embodiment may be made for user authentication or registration of the process execution count, as a matter of course.

[Execution of Job]

In each of the embodiments as described above, when data processing apparatus 100 executes a job, in some cases, data processing apparatus 100 cannot execute a part or all of a processes included in the designated job depending on the status of data processing apparatus 100. For example, in the case of toner-out or paper-out, in the case where a finisher for use in punching is removed, or in the case where the status of the telephone line or the network cable is changed, data processing apparatus 100 sometimes cannot execute a part or all of the processes included in the designated job.

In the following, the operation of data processing apparatus 100 when all of the processes of the designated job cannot be completed will be described. Here, examples of four kinds of operation will be described.

Figure 13:
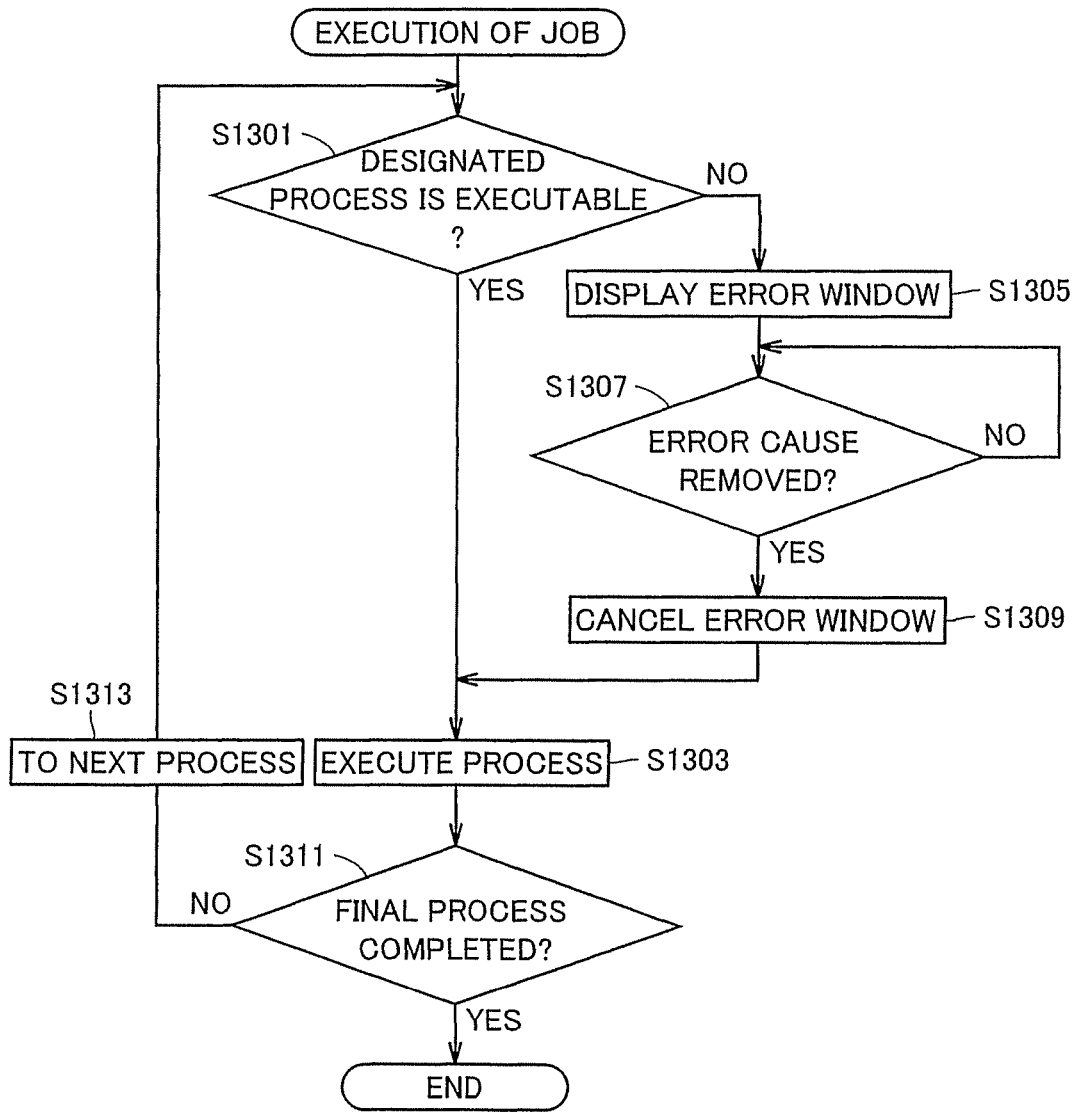
FIG. 13 is a flowchart showing a flow of a process performed by the controller when an error window appears.

A first operation is display of an error window. A flow of a process performed by controller 200 when an error window appears will be described with reference to FIG. 13.

In step S1301, controller 200 determines whether the designated process is executable. The method by which controller 200 determines whether the designated process is executable varies depending on the kind of designated process. For example, when printing is designated, controller 200 determines whether the output settings including color/monochrome etc. of the designated print job are supported for printer portion 130, whether toner and paper are set, or the like.

If the designated process is executable, controller 200 instructs each portion of data processing apparatus 100 to execute the designated process, in step S1303.

If the designated process is not executable (NO in step S1301), controller 200 allows an error window to appear on operation panel portion 110, in step S1305.

The error window may present the cause why the process cannot be executed. For example, in the case of paper-out, controller 200 displays a window indicating the paper-out on operation panel portion 110 to prompt the user to supply paper.

In step S1307, controller 200 determines whether the cause of the error is removed. For example, in the case of paper-out, it is determined whether paper is supplied. If the cause of the error is not removed (NO in step S1307), controller 200 repeats the process in step S1307.

If the cause of the error is removed (YES in step S1307), controller 200 allows operation panel portion 110 to stop displaying the error window and display a normal setting window, in step S1309. Then, controller 200 allows each portion of data processing apparatus 100 to execute the designated process, in step S1303.

Upon execution of the process in step S1303, controller 200 determines whether the designated process is completed to the end, in step S1311.

If the designated process is not completed to the end (NO in step S1311), controller 200 moves on to execution of the next process in step S1313. Then, the processes from step S1301 are repeated.

If the designated process is completed to the end (YES in step S1311), controller 200 ends the process.

Figure 14:
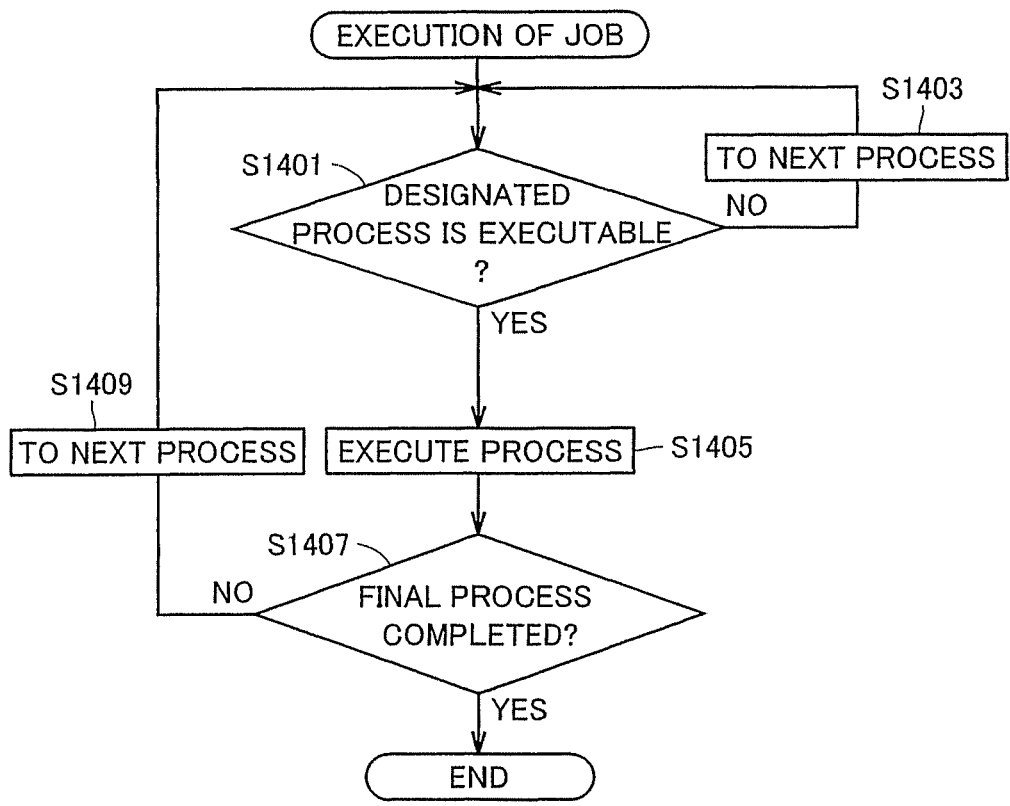
FIG. 14 is a flowchart showing a flow of a process performed by the controller when an inexecutable process is omitted and only an executable process is executed.

A second operation is an operation of omitting a process that cannot be executed (inexecutable) and executing only an executable process. A flow of a process performed by controller 200 when a process that cannot be executed is omitted and only an executable process is executed will be described with reference to FIG. 14.

In step S1401, controller 200 determines whether the designated process is executable. How to determine is similar to the process in step S1301 of the first operation.

If the designated process is not executable (NO in step S1401), controller 200 moves on to execution of the next process as designated, in step S1403. In other words, controller 200 does not perform a process that is not executable. Then, controller 200 performs the process in step S1401 on the next process.

If the designated process is executable (YES in step S1401), controller 200 allows each portion of data processing apparatus 100 to execute the designated process, in step S1405.

When the process is executed in step S1405, controller 200 determines whether the designated process is completed to the end, in step S1407.

If the designated process is not completed to the end (NO in step S1407), controller 200 moves on to execution of the next process in step S1409. Then, controller 200 repeats the processes from step S1401.

If the designated process is completed to the end (YES in step S1407), controller 200 ends the process.

Figure 15:
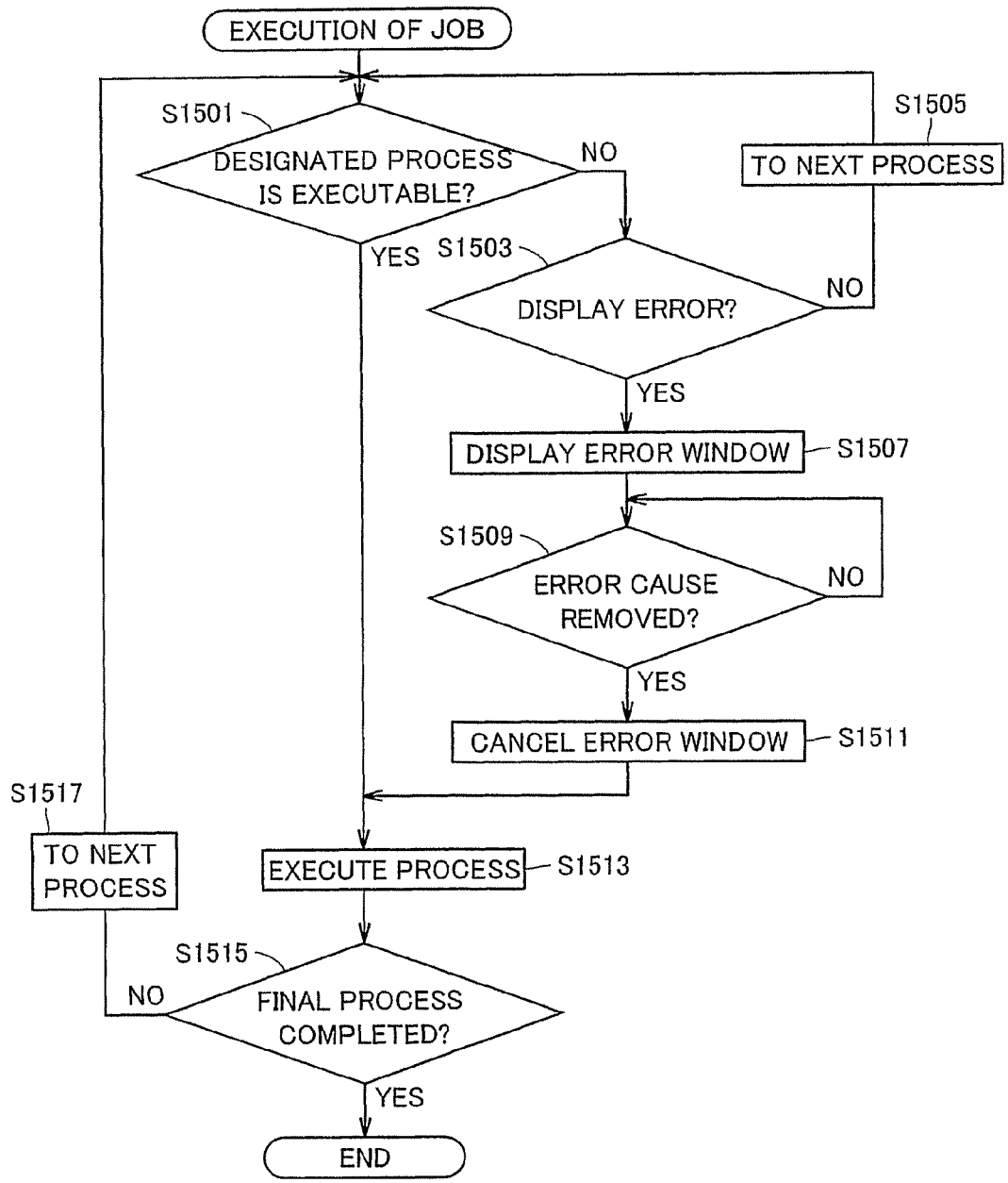
FIG. 15 is a flowchart showing a flow of a process performed by the controller when a select window appears.

A third operation is displaying a select window to select error display or omission of a process. A flow of a process performed by controller 200 when a select window appears will be described with reference to FIG. 15.

In step S1501, controller 200 determines whether the designated process is executable. How to determine is similar to the process in step S1301 of the first operation.

If the designated process is executable (YES in step S1501), controller 200 allows each portion of data processing apparatus 100 to execute the designated process, in step S1513.

If the designated process is not executable (NO in step S1501), controller 200 causes a select window to appear on operation panel portion 110 for allowing the user to select either display of the error window or execution of the next executable process without removing the cause of the error, in step S1503. Here, the error window is a window which indicates to the user the cause why the error happens, namely, the cause why the process cannot be executed and then prompts the user to take an action for removing the error. Controller 200 accepts selection from the user after display of the select window.

If not displaying the error window is selected, namely, if execution of the next process is selected (NO in step S1503), controller 200 moves on to execution of the next process as designated, in step S1505. In other words, controller 200 does not perform the process that is not executable. Then, controller 200 performs the processes from step S1501 on the next process.

If displaying the error window is selected (YES in step S1503), controller 200 allows the error window to appear on operation panel portion 110, in step S1507.

In step S1509, controller 200 determines whether the cause of the error has been removed. If the cause of the error is not removed (NO in step S1509), controller 200 repeats the process in step S1509.

If the cause of the error is removed (YES in step S1509), controller 200 allows operation panel portion 110 to stop displaying the error window and to display the normal setting window, in step S1511. Then, controller 200 allows each portion of the data processing apparatus to execute the designated process, in step S1513.

When the process is executed in step S1513, controller 200 determines whether the designated process is completed to the end, in step S1515.

If the designated process is not completed to the end (NO in step S1515), controller 200 moves on to execution of the next process in step S1517. Then, controller 200 performs the processes from step S1501.

If the designated process is completed to the end (YES in step S1515), controller 200 ends the process.

A fourth operation is termination of an operation. Upon recognition of an error, controller 200 cancels the subsequent process. Controller 200 may add an option of termination of an operation to the select window as described above.

If an operation is terminated halfway, the user can allow another data processing apparatus to perform the process by connecting USB memory 300 to another data processing apparatus 100.

Here, controller 200 may record in USB memory 300 information about the process progress, namely, up to which process has been completed. For example, a process sometimes becomes unable to be executed during the course of execution of the process, for example, when paper-out or toner-out takes place during the course of printing. In such a case, the user can allow another data processing apparatus to perform the continued process by connecting to another data processing apparatus USB memory 300 in which the process progress is registered.

Here, controller 200 may control USB management portion 250 such that the information about the process that has been executed completely is stored in USB memory 300. Alternatively, controller 200 may control such that USB memory 300 only stores target data 1010 corresponding to the process that could not be executed.

Data processing apparatus 100 handles the process that cannot be executed by performing any of the foregoing four kinds of operation.

[Registration of User Information]

A method of registering user information for use in user authentication or designation of a job in the second embodiment in USB memory 300 will be described. The method of registering user information in USB memory 300 mainly includes a method in which a user manually registers user information in USB memory 300 and a method in which data processing apparatus 100 automatically registers user information in USB memory 300 when USB memory 300 is connected to data processing apparatus 100.

Figure 16:
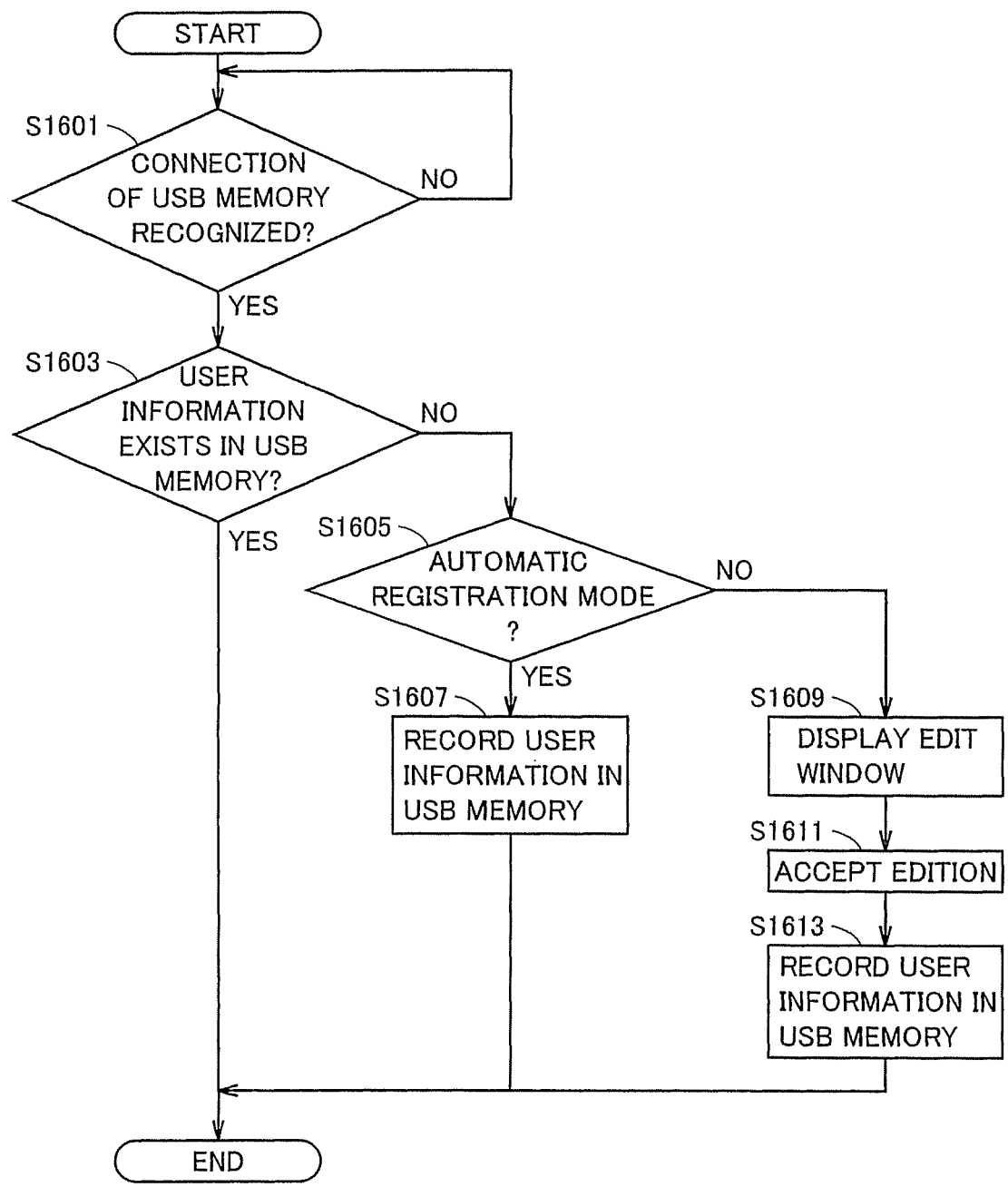
FIG. 16 is a flowchart showing a flow of a process performed by the controller in user information registration.

An example of a user information registration method will be described with reference to FIG. 16.

Controller 200 determines whether connection of USB memory 300 to USB terminal 170 is recognized, in step S1601. If connection of USB memory 300 is not recognized (NO in step S1601), controller 200 repeats the process in step S1601.

In step S1603, controller 200 determines whether user information is stored in USB memory 300.

If user information is stored in USB memory 300 (YES in step S1603), there is no need for newly registering user information, so that controller 200 ends the process.

If user information is not stored in the USB memory (NO in step S1603), controller 200 determines whether an automatic registration mode is set, in step S1605.

If the automatic registration mode is set (YES in step S1605), controller 200 copies the user information stored in storage portion 180 in USB memory 300, in step S1607. Then, the user information registration process is ended.

If the automatic registration mode is not set (NO in step S1605), controller 200 allows a user information edit window to appear on operation panel portion 110, in step S1609.

In step S1611, controller 200 accepts an instruction by the user to operation panel portion 110.

In step S1613, controller 200 registers in USB memory 300 the user information based on the instruction accepted in step S1611.

Here, in the explanation above, the data processing apparatus determines whether in the automatic registration mode in step S1605. However, in the case where the data processing apparatus performs only either automatic registration or manual registration, the data processing apparatus may perform automatic registration or display of the edit window, without determining the mode. Alternatively, in step S1605, the data processing apparatus may display a window to let the user to select automatic registration or manual registration so that the user selects a registration method.

Furthermore, the user can delete and edit the user information once registered, by manual registration. Therefore, the user can even deal with a change of user information.

Now, it causes security concerns that data processing apparatus 100 unconditionally writes user information in the USB memory when the automatic registration mode is set or that the user can edit the user information anytime. Then, a user information edit mode may be provided in the data processing apparatus to allow the data processing apparatus to write user information in USB memory 300 or edit user information only in the user information edit mode. Data processing apparatus 100 shifts to the user information edit mode when a user performs a particular operation on data processing apparatus 100 or when a user having a special authority, such as a manager or a serviceman, logs in.

Here, it is assumed that many of users who use USB memory 300 work at computers. Then, the computer connected to the data processing apparatus may record user information in the data processing apparatus or edit the user information stored in the data processing apparatus using a remote control system such as PSWC (Page Scope Web Connection). Alternatively, the computer may write user information in an external memory connected to the computer.

In step S1607, the method by which controller 200 copies the user information stored in storage portion 180 into USB memory 300 in step S1607 may be as follows. Controller 200 obtains the user information stored in storage portion 180 which corresponds to the information input by the user at a time of user authentication in data processing apparatus 100. Then, controller 200 copies the obtained user information into USB memory 300. However, the process performed by the controller in step S1607 is not limited thereto.

[Recording of Correspondence List]

The recording of correspondence list 186 used in the first embodiment and the second embodiment will be described.

Correspondence list 186# in the first embodiment associates the name of a job (information for specifying a job) with the process corresponding to the job. Data processing apparatus 100 registers or edits correspondence list 186# through an operation by the user.

Alternatively, the user may edit the correspondence list stored in one data processing apparatus so that the correspondence list stored in another data processing apparatus connected via a network or the like is edited similarly. Alternatively, the user may perform registration or edition on a personal computer connected to the data processing apparatus. In this case, the user may edit the correspondence list stored in a plurality of data processing apparatuses connected to the personal computer with one operation.

Correspondence list 186## in the second embodiment associates a user name with a process which each user gives an instruction to execute. Correspondence list 186## in the second embodiment may be registered or edited through an operation by the user on the data processing apparatus or a personal computer. Alternatively, correspondence list 186## may be registered in response to a process performed by the user on the data processing apparatus.

Figure 17:
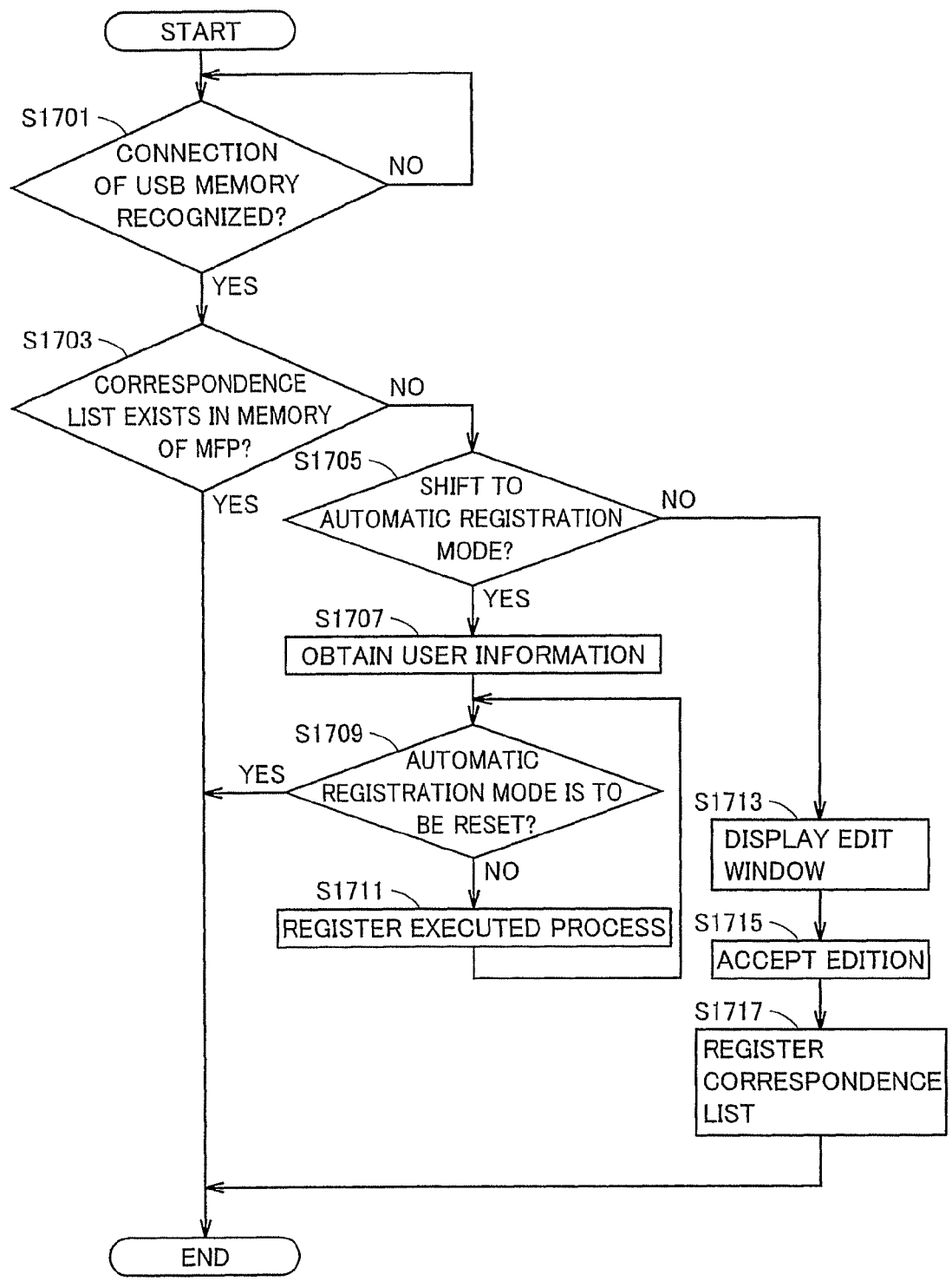
FIG. 17 is a flowchart showing a flow of a process performed by the controller in registration of a correspondence list in accordance with the second embodiment.

An example of a method of registering correspondence list 186## in the second embodiment will be described with reference to FIG. 17.

Controller 200 determines whether connection of the USB memory to USB terminal 170 is recognized, in step 1701. If connection of the USB memory is not recognized (NO in step S1701), controller 200 repeats the process in step S1701.

In step S1703, controller 200 determines whether correspondence list 186## is stored in storage portion 180.

If correspondence list 186## is stored in storage portion 180 (YES in step S1703), there is no need for newly registering a correspondence list, so that controller 200 ends the process.

If correspondence list 186## is not stored in storage portion 180 (NO in step S1703), controller 200 determines whether the correspondence list automatic registration mode is set, in step S1705.

If the automatic registration mode is set (YES in step S1705), controller 200 obtains the user information stored in USB memory 300, in step S1707.

In step S1709, controller 200 determines whether an instruction to reset the automatic registration mode is accepted.

If an instruction to reset the automatic registration mode is accepted (YES in step S1709), controller 200 ends the correspondence list 186## registration process.

If an instruction to reset the automatic registration mode is not accepted (NO in step S1709), controller 200 associates the process executed by data processing apparatus 100 with the user information obtained in step S1707 and registers the same in correspondence list 186##, in step S1711. For example, when data processing apparatus 100 executes printing of data, controller 200 registers the process "printing" in association with the user information.

After completion of step S1711, controller 200 performs the process in step S1709 again. More specifically, controller 200 registers the process executed by data processing apparatus 100 in correspondence list 186## until an instruction to reset the automatic registration mode is accepted.

If not in the automatic registration mode (NO in step S1705), controller 200 allows a correspondence list 186## edit window to appear on operation panel portion 110, in step S1713.

In step S1715, controller 200 accepts an instruction to operation panel portion 110 by the user.

In step S1717, controller 200 registers the information based on the accepted instruction in step S1715 in correspondence list 186##.

[Recording of Automatic Execution Process]

Finally, the recording of the automatic execution job recorded in USB memory 300 in the third embodiment will be described with reference to FIG. 18.

Controller 200 determines whether connection of the USB memory to USB terminal 170 is recognized, in step S1801. If connection of USB memory 300 is not recognized (NO in step S1801), controller 200 repeats the process in step S1801.

In step S1803, controller 200 determines whether automatic execution job information is stored in USB memory 300.

If automatic execution job information is stored in USB memory 300 (YES in step S1803), controller 200 ends the process. This is because there is no need for newly registering an automatic execution job.

If automatic execution job information is not stored in USB memory 300 (NO in step S1803), controller 200 determines whether the automatic recording mode of an automatic execution job is set, in step S1805.

If the automatic recording mode is set (YES in step S1805), in step S1807, controller 200 determines whether an instruction to reset the automatic recording mode is accepted.

If an instruction to reset the automatic recording mode is accepted (YES in step S1807), controller 200 ends the automatic execution job recording process.

If an instruction to reset the automatic recording mode is not accepted (NO in step S1807), controller 200 registers the process executed by data processing apparatus 100 as an automatic execution job, in step S1809. For example, when data processing apparatus 100 executes printing of data, controller 200 registers the process "print" as an automatic execution job.

After completion of step S1809, controller 200 performs the process in step S1807 again. More specifically, controller 200 records the process executed by the data processing apparatus as an automatic execution job until an instruction to exit from the automatic recording mode is accepted.

If not in the automatic recording mode (NO in step S1805), controller 200 allows an automatic execution job edit window to appear on operation panel portion 110, in step S1811.

In step S1813, controller 200 accepts an instruction to operation panel portion 110 by the user.

In step S1815, controller 200 records the automatic execution job edited based on the instruction accepted in step S1813 in USB memory 300.

Here, in the explanation above, the data processing apparatus determines whether in the automatic recording mode in step S1805. However, if the data processing apparatus performs only either automatic recording or manual recording, the data processing apparatus may perform automatic recording or display of the edit window, without determining the mode. Alternatively, the data processing apparatus may display a window to let the user to select automatic recording or manual recording so that the user selects a recording method, in step S1805.

Alternatively, a computer may write an automatic execution job in USB memory 300 connected to the computer.

Furthermore, the data processing apparatus or a computer may edit or delete the automatic execution job that has already been registered. The data processing apparatus or a computer may be allowed to perform such edition or deletion only in the edit mode.

[Others]

Any appropriate combination of the embodiments as described above is included in the present invention, as a matter of course.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A data processing apparatus comprising:
    a connector to which a removable external memory is attachable,
    wherein said external memory stores designation information for specifying a process to be executed by said data processing apparatus, of a plurality of processes executable by said data processing apparatus on document data or image data,
    said designation information is described in a format common to said data processing apparatus and another data processing apparatus connected to said data processing apparatus and said designation information is an automatic execution job to allow said data processing apparatus to automatically execute said process, and
    said external memory further stores user information for specifying a user of said external memory;
    a memory reader reading information stored in said external memory;
    a processor performing said process specified by said designation information on said document data or said image data;
    a storage portion storing apparatus user information for specifying a user of said data processing apparatus; and
    a controller controlling an operation of each portion of said data processing apparatus,
    said controller including a connection determination portion determining an attachment state of said external memory to said connector,
    wherein, in response to said connection determination portion determining that said external memory is connected to said connector, if said controller determines that said memory user information matches said apparatus user information, said controller automatically controls said memory reader to read said designation information including said automatic execution job from said external memory and automatically outputs an instruction corresponding to the process specified by said read designation information to said processor.

2. The data processing apparatus according to claim 1, further comprising a storage portion storing a list in which information for specifying each of said plurality of prescribed processes and a content of each of said plurality of processes are associated with each other,
    wherein said controller outputs said instruction corresponding to said process specified by said designation information to said processor, based on said designation information and said list.

3. The data processing apparatus according to claim 2, wherein
    said designation information includes apparatus user information for specifying a user of said data processing apparatus,
    said list associates said user of said data processing apparatus with said content of said process, and
    said controller outputs to said processor said instruction corresponding to said process associated with said user of said data processing apparatus as specified by said user information, based on said designation information and said list.

4. The data processing apparatus according to claim 1, wherein
    said controller includes an authentication portion recording an execution count of said process specified by said designation information, and
    when said execution count is equal to or lower than a prescribed count, said controller outputs said instruction corresponding to said process specified by said read designation information to said processor.

5. The data processing apparatus according to claim 1, wherein
    said external memory further stores memory user information for specifying a user of said external memory,
    said data processing apparatus further comprises an input portion accepting an external input, and
    when said controller determines that said memory user information matches said input, said controller outputs to said processor said instruction corresponding to said process specified by said read designation information.

6. The data processing apparatus according to claim 1, further comprising:
    an input portion accepting an external input, and
    a storage portion storing apparatus user information for specifying a user of said data processing apparatus,
    wherein when said controller determines that said apparatus user information matches said input, said controller outputs to said processor said instruction corresponding to said process specified by said read designation information.

* * * * *